United States Patent [19]

Gilas

[11] Patent Number: 5,110,460
[45] Date of Patent: May 5, 1992

[54] CENTRIFUGAL SEPARATOR FOR A LIQUID CAPABLE OF WAXING, IN PARTICULAR FOR DIESEL OIL

[75] Inventor: François Gilas, La Chapelle Rablais, France

[73] Assignee: GEC Alsthom SA, Paris, France

[21] Appl. No.: 541,643

[22] Filed: Jun. 21, 1990

[30] Foreign Application Priority Data

Jun. 21, 1989 [FR] France ............................ 89 08283

[51] Int. Cl.⁵ ..................... B01D 21/30; B01D 35/18
[52] U.S. Cl. .................................. 210/149; 210/184;
  210/304; 210/305; 210/444; 210/DIG. 17;
  123/196 A; 123/557; 184/6.22; 184/6.24
[58] Field of Search ............... 210/149, 184, 232, 303,
  210/304, 305, 443, 444, DIG. 17; 123/196 A,
  196 AB, 557; 184/6.22, 6.24

[56] References Cited

U.S. PATENT DOCUMENTS

| | | | |
|---|---|---|---|
| 3,931,011 | 1/1976 | Richards et al. | 210/136 |
| 4,006,084 | 2/1977 | Priest | 210/184 |
| 4,091,265 | 5/1978 | Richards et al. | 210/184 |
| 4,227,969 | 10/1980 | Engel | 210/184 |
| 4,388,185 | 6/1983 | Ott et al. | 210/184 |
| 4,437,986 | 3/1984 | Hutchins et al. | 210/184 |
| 4,473,054 | 9/1984 | Marcoux et al. | 210/184 |
| 4,522,712 | 6/1985 | Fischer et al. | 210/184 |
| 4,580,542 | 4/1986 | Kawabata | 210/184 |
| 4,585,924 | 4/1986 | Pakula | 210/184 |
| 4,603,244 | 7/1986 | Genz | 123/196 A |
| 4,680,110 | 7/1987 | Davis | 210/184 |
| 4,997,555 | 3/1991 | Church et al. | 210/184 |

FOREIGN PATENT DOCUMENTS

| | | |
|---|---|---|
| 2845519 | 5/1980 | Fed. Rep. of Germany . |
| 3317008 | 11/1984 | Fed. Rep. of Germany . |
| 3415522 | 11/1985 | Fed. Rep. of Germany . |
| 3543842 | 6/1987 | Fed. Rep. of Germany . |
| 1464394 | 11/1966 | France . |
| 2386685 | 4/1977 | France . |
| 2548920 | 7/1984 | France . |
| 2621959 | 10/1987 | France . |

Primary Examiner—Stanley S. Silverman
Assistant Examiner—Robert James Popovics
Attorney, Agent, or Firm—Sughrue, Mion, Zinn, Macpeak & Seas

[57] ABSTRACT

A separator of the present invention includes a lid (12) constituting an inlet duct (4) for conveying diesel fuel to a deflector (6) which imparts a centrifugal velocity thereto inside a centrifuging bowl (8). The centrifuged liquid rises, passes through a filter (18), and leaves via an outlet duct (10). These two ducts are heated by an electrical resistance (16) incorporated in the solid metal of the lid by casting. The lid is provided with fins (24) for heating the diesel oil in the vicinity of the filter. The invention is particularly applicable to feeding fuel to diesel engines in goods vehicles.

8 Claims, 3 Drawing Sheets

CENTRIFUGAL SEPARATOR FOR A LIQUID CAPABLE OF WAXING, IN PARTICULAR FOR DIESEL OIL

FIELD OF THE INVENTION

The present invention is applicable, in general, to any liquid capable of waxing and which needs treatment in order to separate out emissible elements therefrom.

BACKGROUND OF THE INVENTION

The term "waxing" is used herein to indicate that the invention is particularly applicable to the case where the liquid to be treated includes certain components that may indeed be miscible, e.g. paraffins in diesel oil, but which tend to solidify first when the temperature drops and which can then give rise to localized blockages in a circuit having other portions in which the liquid remains sufficiently fluid. Nevertheless, the invention is also applicable to a liquid in which solidification takes place at a single determined temperature and then takes place completely.

The invention is even more particularly suitable for vehicles, in particular goods vehicles, having a diesel engine running on diesel oil. The circuit for feeding the engine with fuel from the tank in a common type of goods vehicle includes the following items:
  a feed pump having moderate delivery pressure for transferring diesel oil from the tank;
  a static centrifugal separator for intercepting water droplets and solid particles that may be contained in the diesel oil;
  filters for intercepting other solid particles of various sizes, e.g. a prefilter for intercepting large particles and a fine filter for intercepting finer particles; and
  an injection pump for injecting appropriate volumes of diesel oil at appropriate instants into each engine cylinder.

A filter element may be integrated in the centrifugal separator.

Such a goods vehicle may sometimes be required to start and run when the temperature of the atmosphere is low enough to solidify paraffins contained in the diesel oil. That is why a major need has long been felt to avoid particles of solidified paraffin blocking the narrow passages formed for diesel oil through the separator in cold weather. Such narrow passages are constituted, in particular, by the pores through the filter element which may be integrated in the separator.

A known solution to the problem posed by this need consists in adding additives to the diesel oil to delay the formation and the growth of particles of solidified paraffin.

Another solution appears in a first prior separator which does not include centrifugal separation means. A separator of the present invention includes some items in common with said prior separator with respect to the functions mentioned below. These common items are:
  a separator for a liquid capable of waxing, in particular for diesel fuel, the separator comprising:
  a separation bowl having an axis and a bowl opening around said axis;
  a lid for closing said bowl opening, said lid being constituted at least in part by a heat-conducting material and having an inside face adjacent to said separation bowl and an opposite outside face;
  a filtering wall extending around the said axis inside said separation bowl, said wall being carried by said lid from said inside face thereof;
  a separator inlet for receiving a liquid to be treated, the liquid containing elements capable of waxing under the effect of low temperature, said inlet conveying said liquid to face an upstream face of said filtering wall;
  a separator outlet for receiving said liquid to be treated after it has passed through said filtering wall to face a downstream face thereof; and
  a heater element in thermal contact with said lid for heating said liquid to be treated via said lid.

Such a prior separator is described in Document DE-A-2 845 519 (a German patent application no. by Bosch). In this prior separator, the separation bowl is constituted by a filter capsule, said lid is generally in the form of a thick plate, and said inlet duct extends through the thickness of said plate as does a hot water circuit which constitutes said heater element. This first prior separator suffers, in particular, from the drawback of being poor at separating out some impurities such as water droplets and of requiring the filter element to be replaced too frequently.

A second prior separator includes a fixed centrifuging deflector disposed in said separation bowl, which then constitutes a centrifuging bowl. It was manufactured by the American firm Racor Industries Inc., of Modesto, California USA. It is derived from a separator as described in U.S. Pat. No. 3 931 011 (Richards et al.) to which said heater element has been added in the form of an electrical resistance. This resistance is immersed in the centrifuged diesel oil flowing inside an enclosure which is formed above the lid of the centrifuging bowl and which contains a filter element over said resistance. Given the direction of liquid flow, the resistance is thus placed upstream from said filter element and it is temporarily exposed at the end of the enclosure each time the filter element is changed after it has become clogged.

This second prior filter operates in a generally acceptable manner but its users would prefer it to be cheaper to purchase, more compact, and easier to maintain without risk of damage. Naturally, it is also desirable to minimize the amount of electrical energy which is consumed for initially heating diesel oil in cold weather.

The present Applicant has obtained a French patent No. 2 596 668 for a centrifugal separator which does not include a heater element.

SUMMARY OF THE INVENTION

When applied to a separator for feeding a diesel engine with diesel fuel in a vehicle such as a goods vehicle, the present invention has the following objects, in particular:
  reducing the cost and/or bulk of the separator;
  providing more effective and/or better distributed heating of the diesel oil in the separator; and/or
  minimizing the risks of the heater element situated in such a separator being damaged, in particular during maintenance operations such as changing the filter element.

Nevertheless, it should be understood that the invention may be applied to treating other liquids capable of waxing, in particular other hydrocarbons that may be used for other purposes. For example it may be used with heating oil consumed in a boiler. At least some of the above-mentioned objects are still applicable.

In a separator of the present invention, said lid includes a heat-conveying extension projecting from said inside face thereof facing and in the proximity of said upstream face of said filtering wall in such a manner as to prevent said wall being blocked by said elements capable of waxing.

Said separator may also include the following preferred dispositions:

said heat-conveying extension forms fins which extend radially and axially and which are angularly distributed around said axis;

said lid is generally in the form of a thick plate perpendicular to said axis, inlet and outlet ducts being formed parallel to said plate in the thickness thereof respectively for conveying said liquid to be treated from said separator inlet to said filtering wall, and from said filtering wall to said separator outlet;

said filtering wall and said separation bowl are disposed beneath said lid, said lid including the following in successive levels from bottom to top: said heat-conveying extension, said extension surrounding said filtering wall;

a heating level including said heater elements, said element being elongate and forming substantially one turn around said axis; and a connection level in which said inlet and outlet ducts are formed;

the separator further includes a thermostat placed in thermal contact with said lid and controlling said heater element to maintain the temperature of said lid between predetermined limits;

said heater elements is an electrical heater resistance; and said heater resistance is incorporated in the mass of said lid by casting, said lid being constituted by a metal having a melting point which is substantially lower than that of the materials constituting said resistance. The additional cost due to incorporating the resistance in this way is very small because the conventional and cheap way of making the lid is by casting.

It is also clear that the heater element could be constituted by means other than an electrical resistance. For example, it could be a hot water circuit which could advantageously be formed in the lid simultaneously with and using the same methods as are used for the above-mentioned connection system.

An implementation of the present invention is described below with reference to the accompanying diagrammatic FIGS., it being understood that the items and dispositions described and shown are given purely by way of non-limiting example. When the same item appears in several FIGS., it is designated in all of them by the same reference symbol. The embodiment described by way of example includes the above-mentioned common and preferred dispositions.

DESCRIPTION OF THE PREFERRED EMBODIMENT

The separator given by way of example is intended to filter diesel fuel for the diesel engine of a goods vehicle.

It has a vertical axis A. An axial tube 1 interconnects the top and bottom portions of the separator.

The separator includes an inlet 2 for receiving diesel oil which constitutes the liquid to be treated, and an inlet duct 4 for conveying said liquid to a deflector 6 which imparts a circumferential velocity component thereto.

Figure 1:
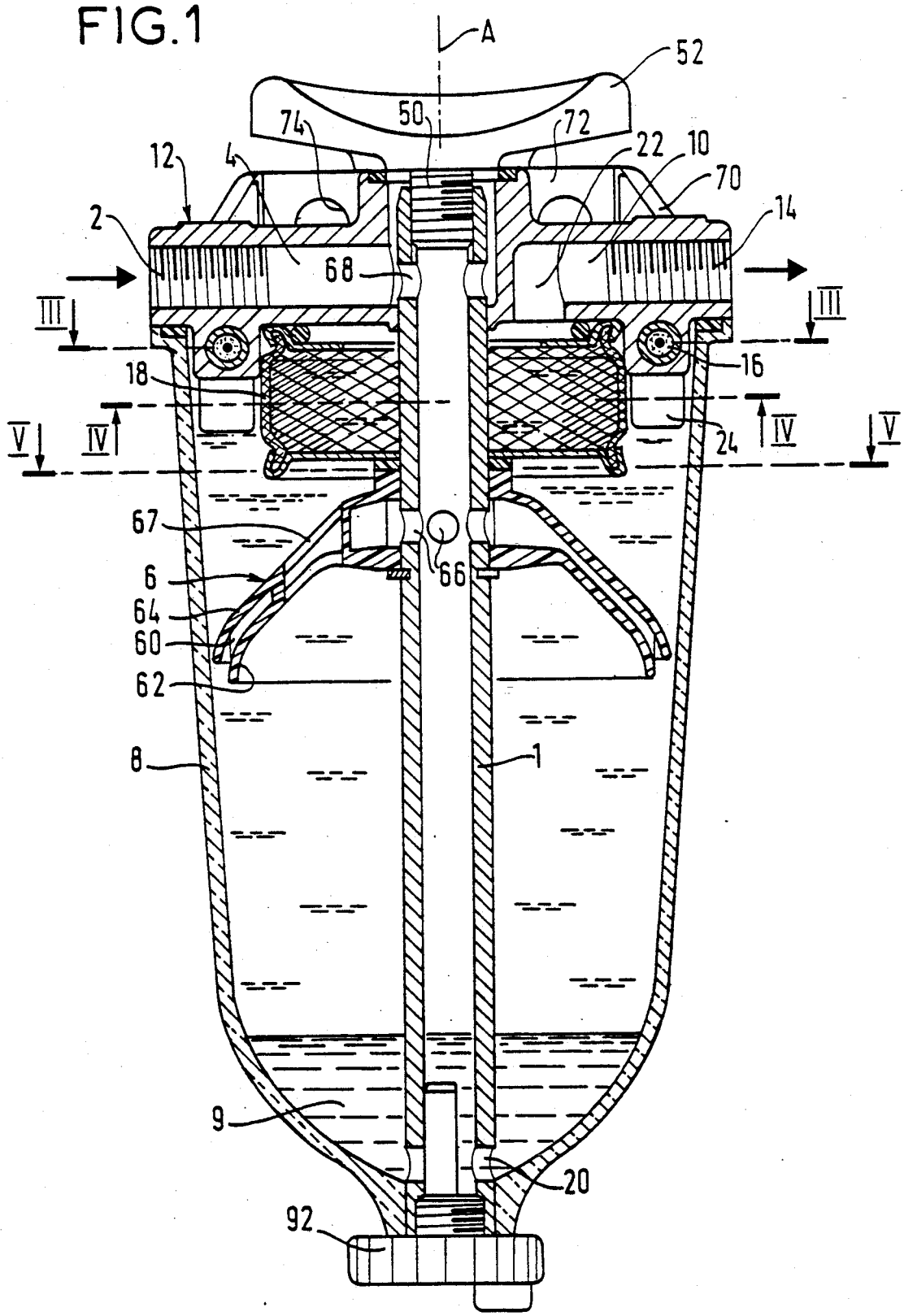
FIG. 1 is an axial vertical sectional view through a separator made in accordance with the present invention.
Figure 5:
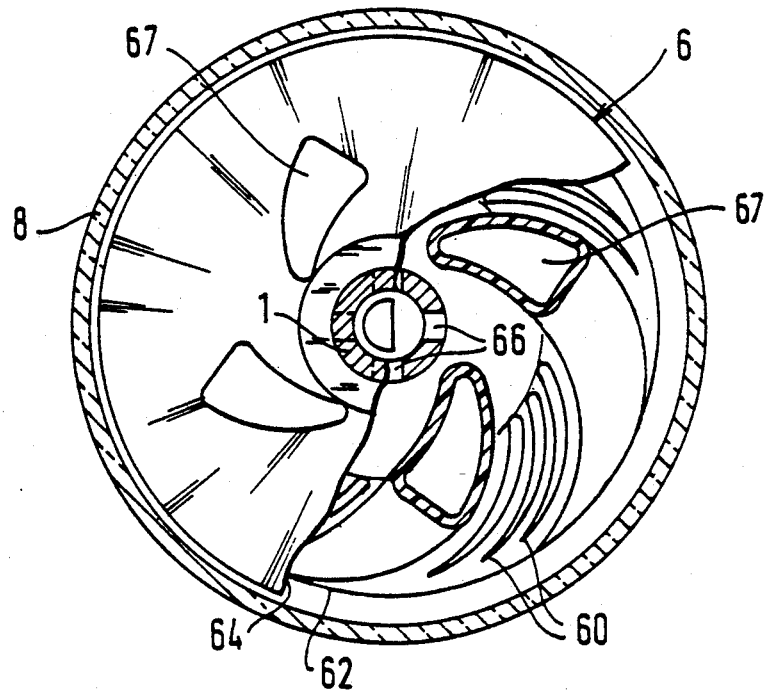

For this purpose, the deflector includes fins (see FIGS. 1 and 5) which extend in a spiral around the axis A and which extend vertically to interconnect a lower cup 62 and a higher cup 64.

The spiral channels formed by these fins receive the liquid from openings 66 pierced through the tubular shaft 1 which receives said liquid via a top opening 68 in communication with the inlet duct 4. The narrowness and the curvature of these channels cause centrifugal force to appear in the diesel fuel which flows through them at high speed, said force throwing droplets of water against the fins. These droplets thus coalesce into drops which then settle out more easily, by natural gravity or by centrifugal force.

A centrifuging bowl designated by its side wall 8 guides the rotation of this liquid and gives rise to centrifugal force therein causing relatively dense impurities, e.g. water or dust contained in the liquid, to make contact selectively with said wall. These impurities then settle under the action of gravity in the bottom 9 of the bowl, while the centrifuged liquid rises towards the top of the bowl. The bowl is made of a material which is both strong and transparent in order to enable the impurities that have accumulated therein to be seen.

The water which thus collects at the bottom 9 of the bowl is evacuated therefrom when required via a passage that can be opened by partially unscrewing a bleed plug 92. To do this, the water passes initially into the axial tube 1 via openings 20. Solid impurities adhering to the wall of the bowl can be cleaned by removing the bowl and washing it.

An outlet duct 10 conveys the centrifuged liquid to an outlet from the separator.

A solid metal lid 12 closes the top opening of the bowl, with the integrated connection system constituted by the ducts 4 and 10 being formed in the solid metal. The lid is applied to the top edge of the bowl by a screw 50 which is screwed into the axial tube 1 by means of a knob 52. The lid is generally in the form of a thick horizontal plate with the inlet and outlet ducts being formed horizontally and radially in the thickness thereof.

A heater element constituted by a screened electric resistance 16 is incorporated in the solid metal of the lid. The lid is made of a metal which is a good conductor of heat so as to convey heat between the resistance and the connection system integrated in the lid. The resistance is elongate and forms substantially one turn around the axis A.

Figure 2:
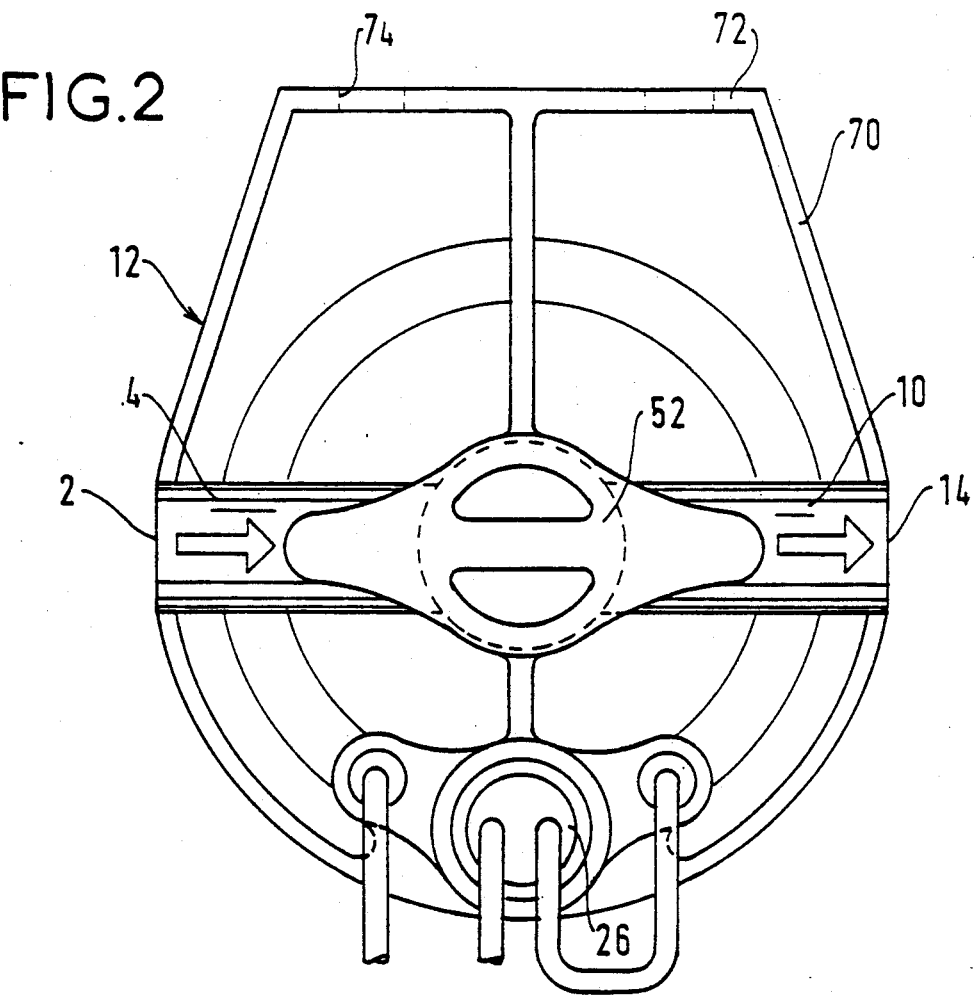
FIG. 2 is a plan view of the separator.
Figure 3:
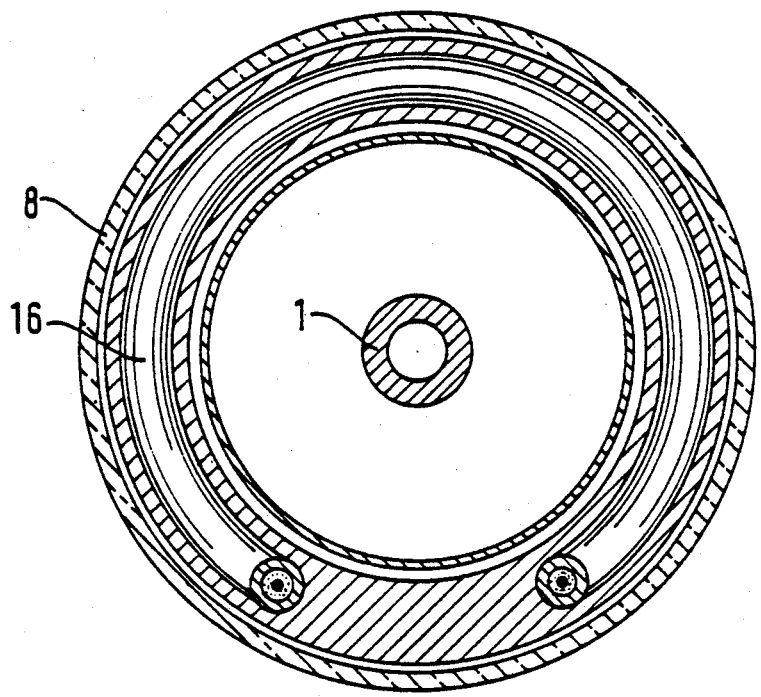
FIGS. 3, 4, and 5 are cross-section views through the separator on respective planes III-III, IV-IV, and V-V of FIG. 1.
Figure 4:
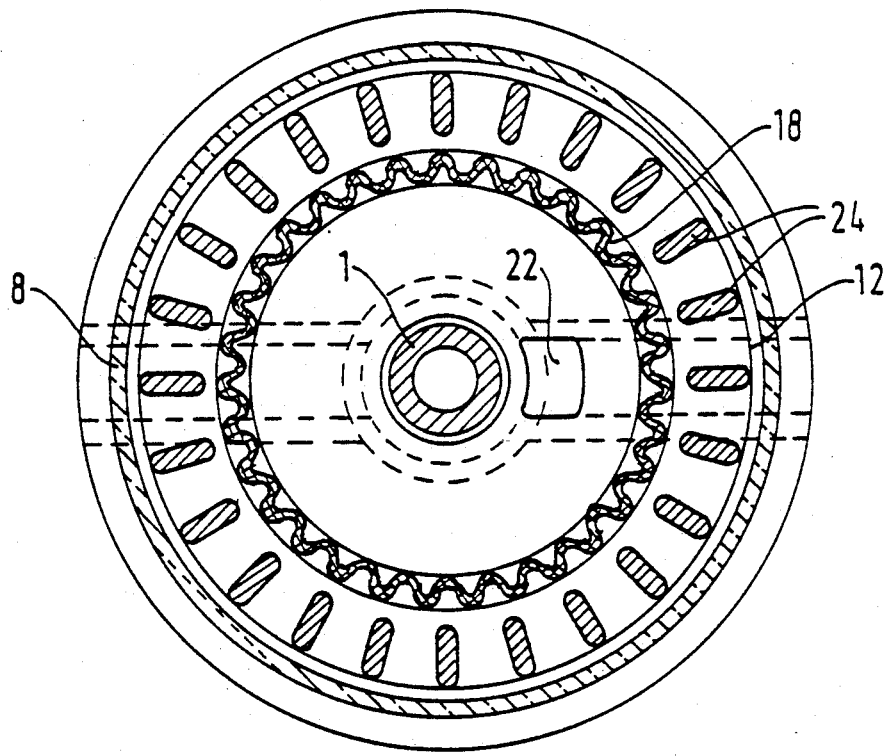

A thermostat 26 is placed in thermal contact with the lid 12 (see FIG. 2). It controls the resistance 16 so as to maintain the temperature of the lid between predetermined limits.

A filtering wall 18 surrounds the axial tube 1 beneath the lid 12 and in the vicinity thereof. The centrifuged liquid passes through the filtering wall so that relatively large solid particles carried along by the liquid are stopped, thereby providing prefiltered liquid at the outlet. The filtering wall has a face which is upstream and a face which is downstream relative to the flow direction of the liquid passing through it.

More particularly, this liquid comes from the central portion of the bowl 8 situated beneath the deflector 6. To do this it rises through four openings 67 formed through the deflector and it arrives around the filter wall 18 through which it passes radially inwards. It then reaches the outlet duct 10 by rising through a passage 22 formed in the lid 12.

The filtering wall 18 is constituted by a filter cartridge which is easily cleaned or changed when the separator is disassembled by undoing the screw 50.

As mentioned above, the lid 12 includes a heat-conveying extension projecting axially beside the filtering wall close to and facing the upstream face thereof, i.e. more particularly projecting downwards around said wall. The extension is in the form of fins 24 which extend radially and axially and which are angularly spaced around the filtering wall. In cold weather, the heat conveyed in this way prevents the filtering wall being blocked by solidified particles.

The lid 12 comprises the following in successive levels from bottom to top:
- the heat-conveying extension constituted by the fins 24;
- a heating level including the heater element 16; and
- a connection level in which the connection system is formed.

The lid also has a lateral extension 70 (see FIGS. 1 and 2) which includes a vertical fixing plate 72 pierced by two holes 74 through which bolts (not shown) may be passed for fixing the separator on a vertical wall of a goods vehicle.

I claim:

1. A separator for a liquid capable of waxing under the effect of low temperature, in particular for diesel fuel, the separator comprising:
    a vertically upright separation bowl (8) having a vertical axis (A) and a bowl opening around said axis;
    a lid (12) closing said bowl opening, said lid being constituted at least in part by a heat-conducting material and having an inside face adjacent to said separation bowl and an opposite outside face;
    an annular filtering wall (19) extending around the said axis inside said separation bowl, said wall being carried by said lid from said inside face thereof;
    a separator inlet (2) for receiving said liquid, said inlet conveying said liquid in the direction of an upstream face of said filtering wall;
    a separator outlet (14) for receiving said liquid after it has passed through said filtering wall to face a downstream face thereof; and
    a heater element (16) in thermal contact with said lid for heating said liquid;
    the improvement wherein said lid (12) includes a heat-conveying extension of said lid (12), projecting from said inside face thereof, facing and in the proximity of said upstream face of said filtering wall (18) to prevent said wall from being blocked by said elements of said liquid capable of waxing said heat-conveying extension comprises a plurality of fins (24) extending radially and axially and being angularly spaced around said axis (A).

2. A separator according to claim 1 in which said lid (12) is generally in the form of a plate extending perpendicular to said axis, inlet and outlet ducts (4, 10) within said plate and extending parallel to said plate for conveying, respectively, said liquid from said separator inlet (2) to said filtering wall (18), and from said filtering wall to said separator outlet (14).

3. A separator according to claim 2, wherein said filtering wall (18) and said separation bowl (8) are disposed beneath said lid (12), said lid (12) having at successive vertical heights from bottom to top:
    said heat-conveying extension, said extension surrounding said filtering wall (18);
    said heater element (16) being elongate and forming substantially one turn around said axis (A); and
    said inlet and outlet ducts (4, 10).

4. A separator according to claim 1, further including a thermostat (26) placed in thermal contact with said lid (12) and operatively connected to said heater element (16) to maintain the temperature of said lid between predetermined limits.

5. A separator according to claim 4, in which said heater element (16) is an electrical heater resistance.

6. A separator according to claim 5, wherein said electrical heater resistance (16) is cast in the mass of said lid (12) and, said lid is constituted by a metal having a melting point which is substantially lower than that of the material constituting said resistance.

7. A separator according to claim 1, wherein said filtering wall (18) and said separation bowl (8) are disposed beneath said lid (12), said separator further including a deflector (6) disposed beneath said filtering wall (18) receiving said liquid from said inlet (2) and imparting a circumferential velocity component about said axis thereto, said separation bowl being a centrifuging bowl (8) having a side wall surrounding said axis and extending vertically between a bottom opening (9) and a top opening of said bowl, said side wall receiving said liquid to be treated from said deflector and guiding said liquid in rotation about said axis to cause by centrifugal force relatively dense impurities contained in said liquid to selectively move into contact with said side wall, such that said impurities subsequently move down said side wall under the action of gravity towards the bottom of the bowl and a centrifuged liquid rises to face said upstream face of said filtering wall (18).

8. A separator according to claim 7, in which said deflector (6) is fixed, and said liquid is received by said deflectors under pressure.

* * * * *